US009942825B1

(12) United States Patent
Narayanan

(10) Patent No.: US 9,942,825 B1
(45) Date of Patent: Apr. 10, 2018

(54) SYSTEM AND METHOD FOR LAWFUL INTERCEPTION (LI) OF NETWORK TRAFFIC IN A MOBILE EDGE COMPUTING ENVIRONMENT

(71) Applicant: Verizon Patent and Licensing Inc., Arlington, VA (US)

(72) Inventor: Ram Gopal Lakshmi Narayanan, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/470,605

(22) Filed: Mar. 27, 2017

(51) Int. Cl.
| H04W 40/02 | (2009.01) |
| H04W 88/06 | (2009.01) |
| H04W 24/02 | (2009.01) |
| H04W 28/08 | (2009.01) |
| H04W 28/02 | (2009.01) |
| H04L 29/08 | (2006.01) |
| H04W 80/04 | (2009.01) |
| H04W 4/00 | (2018.01) |
| H04W 24/08 | (2009.01) |
| H04W 4/18 | (2009.01) |

(52) U.S. Cl.
CPC .......... *H04W 40/02* (2013.01); *H04L 67/322* (2013.01); *H04L 67/34* (2013.01); *H04W 4/001* (2013.01); *H04W 4/18* (2013.01); *H04W 24/02* (2013.01); *H04W 24/08* (2013.01); *H04W 28/0231* (2013.01); *H04W 28/08* (2013.01); *H04W 80/04* (2013.01); *H04W 88/06* (2013.01)

(58) Field of Classification Search
CPC ..... H04W 40/02; H04W 88/06; H04W 24/02; H04W 24/08; H04W 4/001; H04W 4/18; H04W 28/0231; H04W 28/08; H04W 80/04; H04L 67/34; H04L 67/322
See application file for complete search history.

(56) References Cited

U.S. PATENT DOCUMENTS

| 7,653,689 B1* | 1/2010 | Champagne ....... H04N 21/2402 709/203 |
| 8,549,150 B1* | 10/2013 | Roseman ........... H04N 21/2181 370/351 |
| 9,317,223 B2* | 4/2016 | Reohr ..................... G06F 3/067 |
| 2004/0143850 A1* | 7/2004 | Costa ................. H04N 7/17318 725/115 |
| 2007/0121612 A1* | 5/2007 | Nadeau ............... H04L 12/2801 370/386 |

(Continued)

*Primary Examiner* — Babar Sarwar

(57) ABSTRACT

Lawful Interception (LI) services may be provided in Radio Access Networks (RANs) implementing Mobile Edge Computing (MEC). An enhanced NodeB (eNB) may receive an LI policy that includes instructions for identifying network traffic subject to LI and for providing copies of the network traffic to a LI infrastructure of one or more server devices. When the eNB receives a request for content from a User Equipment (UE), the eNB may determine whether a local instance of the content is available (via MEC) and, based on the LI policy, whether the request and/or the content are subject to LI. When a local instance is available and the request and content are subject to LI, the eNB may provide a copy of the request and the content to the LI infrastructure, in addition to providing a copy of the content to the UE.

20 Claims, 7 Drawing Sheets

(56) References Cited

U.S. PATENT DOCUMENTS

| | | | |
|---|---|---|---|
| 2008/0313623 A1* | 12/2008 | Waddington | G06F 17/30477 717/162 |
| 2012/0093054 A1* | 4/2012 | Liu | H04L 51/26 370/312 |
| 2012/0203925 A1* | 8/2012 | Curcio | H04L 67/12 709/235 |
| 2014/0040432 A1* | 2/2014 | Jung | G06F 17/30902 709/219 |
| 2014/0173232 A1* | 6/2014 | Reohr | G06F 3/0611 711/162 |
| 2014/0229538 A1* | 8/2014 | Ramachandran | G06F 17/30029 709/204 |
| 2015/0016821 A1* | 1/2015 | Li | H04B 10/25751 398/66 |
| 2017/0303115 A1* | 10/2017 | Shapiro | H04N 21/25891 |

\* cited by examiner

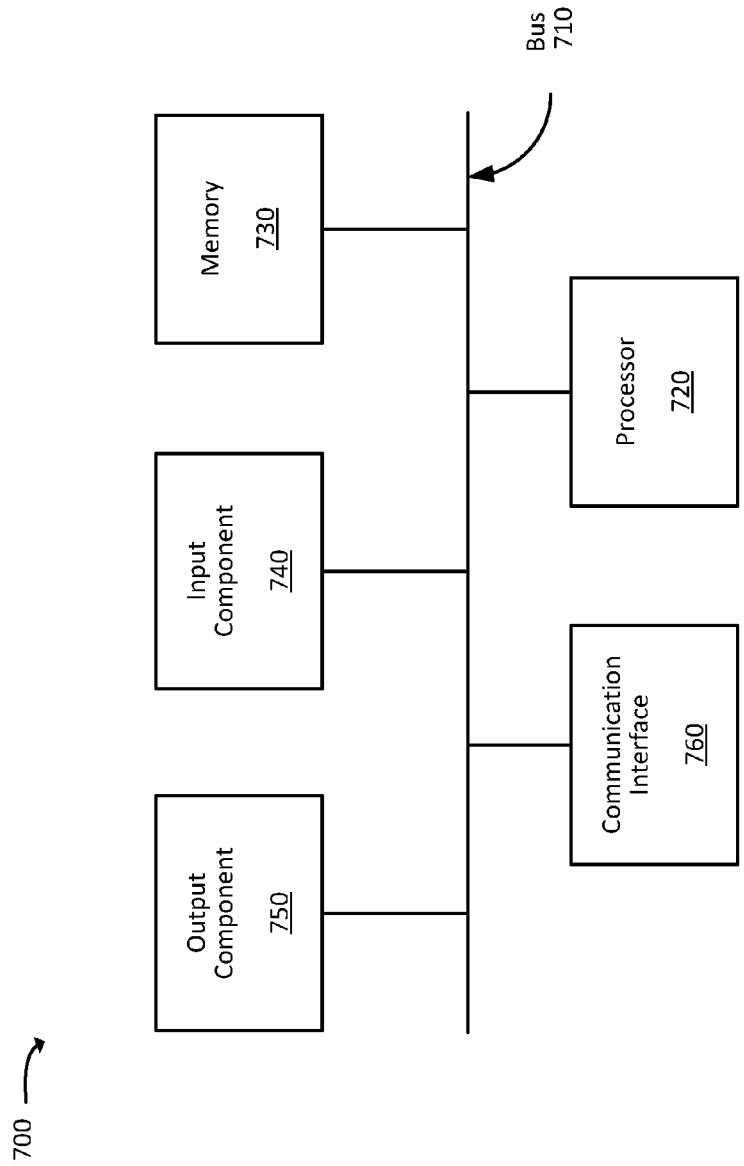

SYSTEM AND METHOD FOR LAWFUL INTERCEPTION (LI) OF NETWORK TRAFFIC IN A MOBILE EDGE COMPUTING ENVIRONMENT

BACKGROUND

In many wireless telecommunication networks, User Equipment (UE) obtain content (e.g., text, images, videos, webpages, etc.) from a content provider by sending a request for the content to a wireless telecommunication network (e.g., a base station and core network). In turn, the wireless telecommunication network may forward the request to a content source (e.g., an application server accessible over the Internet). The content source may respond to the request by sending the content back to the UE through the wireless telecommunication network (e.g., via the core network and the base station). Thus, each time the UE requests the content, the content must flow through the entire wireless telecommunication network, thereby increasing network congestion and decreasing network performance (e.g., downlink rates, uplink rates, and overall network throughput).

Mobile Edge Computing (MEC) has been developed to reduce network congestion and increase network performance by providing Radio Access Network (RANs) with cloud-computing capabilities (e.g., enhanced and dynamic processing capacity, memory capacity, storage capacity, etc.). The cloud computing capabilities can enable content (e.g., social networking services, video streaming services, music streaming services, messaging services, remote storage services, video games, virtual reality services, etc.) to be hosted at (or near) access points (e.g., base stations). For example, a social networking or video streaming service available via the Internet may decide to have another instance of the service hosted by cloud servers local to a base station of a wireless telecommunication network, such that both instances of the service (i.e., the Internet instance or the instance at the base station) provide the same content (e.g., functions, features, text, images, audio recordings, videos, etc.). As such, when a UE sends, to the base station, a request for content corresponding to the social networking or video streaming service, the wireless telecommunication network may provide the requested content from the instance of the service at the base station instead of retrieving the content from the Internet.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 7 is a block diagram of example components of a device.

DETAILED DESCRIPTION OF PREFERRED EMBODIMENTS

Figure 1:
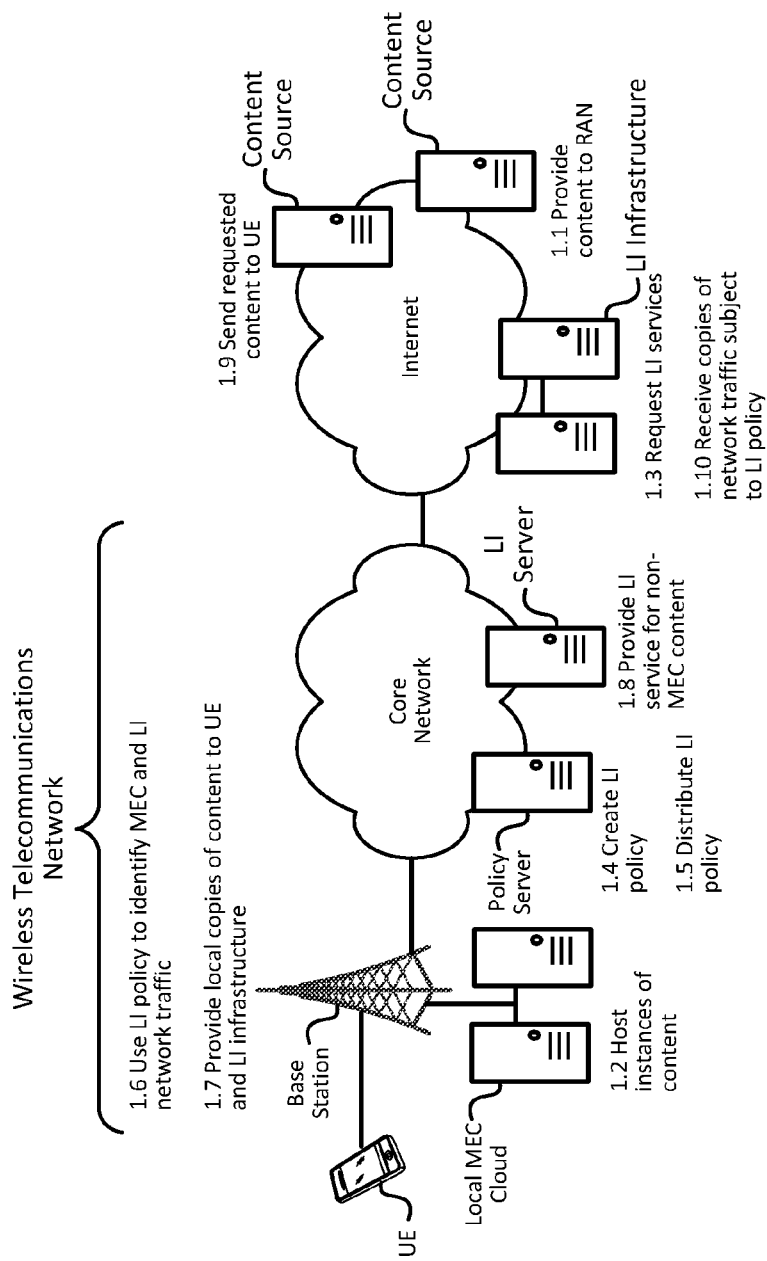
FIG. 1 illustrates an example overview of an embodiment described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Wireless telecommunication networks may implement a lawful monitoring technique, referred to as Lawful Interception (LI), to help governments, law enforcement agencies, or other organizations monitor content (e.g., webpages, text, images, videos, etc.) provided to User Equipment (UE) (e.g., smartphones, tablet computers, laptop computers, etc.) of the wireless telecommunication network. For example, a particular UE may be identified for LI purposes. When the UE requests and is provided content, the wireless telecommunication network may provide a copy of the request, content, etc., to a designated repository (e.g., a cluster of servers).

While LI may enable lawful monitoring of UEs in certain circumstances, LI includes certain limitations. For example, LI techniques are limited to copying content while the content passes through the core network of the wireless telecommunication network. As such, in a Mobile Edge Computing (MEC) scenario, where the wireless telecommunication network temporarily stores content at the Radio Access Network (RAN) (e.g., via a cluster of servers connected to a base station), content may be requested by, and provided to, a particular UE based on a copy of the content that is stored locally by the RAN. In such a scenario, the content may not pass through the core network and, therefore, a copy of the content may not be created and provided to a designated LI repository.

Techniques described herein may be used to provide LI services with a MEC environment. For example, an organization (e.g., a government agency) may provide a request to a wireless telecommunication network, for a particular UE to be monitored for LI purposes. The wireless telecommunication network may create a policy for monitoring the UE and may provide the policy to a MEC portion (e.g., one or more servers connected to a base station) of the wireless telecommunication network. When the content requested by the UE is not stored locally by the MEC portion, the content may be provided to the UE via the core network, Internet, content source (e.g., application server), etc. When content requested by the UE is stored locally by the MEC portion, in addition to providing a copy of the content to the UE (in accordance with typical MEC operations), the MEC portion may determine whether an LI policy is applicable and, if so, may implement the LI policy by providing a copy of the request and a copy of the content to a LI infrastructure (e.g., a cluster of servers configured to receive LI content) of the organization that requested the LI service.

In addition to the functionality of providing LI services in an MEC environment, the techniques described herein may include one or more additional benefits as well. For example, as described in greater detail below, the techniques described herein may be used to conceal, from the UE, whether content is being provided from the MEC portion of the network or from an original content source (e.g., an application server available via the Internet). Additionally, the MEC portion may preserve a Quality of Experience (QoE) by providing content at the same level of quality (e.g., resolution, color scheme, playback speed, etc.) as the version of the content available from the content source.

FIG. 1 illustrates an example overview of an embodiment described herein. As shown, a content source (e.g., a web server, an application server, etc.) may host content (e.g., a website, webpage, application, text, image, video, etc.) that is available over the Internet. The content source may provide a copy of the content to a RAN, consisting of a base station and a local MEC cloud, of a wireless telecommunication network (at 1.1). The local MEC cloud may include one or more servers operating as a cloud computing environment capable of providing MEC services, which may include hosting a local instance of content also available at a content source (at 1.2). Examples of content may include social networking services, an online-banking services, a messaging services, audio streaming services, video streaming services, etc. Additionally, the instance of the service hosted by the local MEC cloud may include the same features, functions, and content that available at the content source. As such, if/when a UE requests content from the content source, if an instance of the content is also hosted by the local MEC cloud, the RAN may provide the requested content from the local MEC cloud instead of from the content source.

An LI infrastructure (which may include one or more servers that are owned or operated by a government agency, a law enforcement entity, etc.) may request that the wireless telecommunication network provide LI services (at 1.3). As described herein, LI services may include monitoring network traffic for certain types of network activity (e.g., communications involving a certain device, a certain type of message, certain content, etc.) and providing a copy of the network activity to a designated devices (e.g., a server of LI infrastructure). A policy server of the wireless telecommunication network may receive the request and create a LI policy based on the request (at 1.4). The LI policy may include instructions for identify network activity (also referred to herein as "network activity of interest") as defined, or otherwise characterized, by request for the LI services and instructions for providing a copy of the network activity of interest to a particular system or device (e.g., LI infrastructure). After creating the LI policy, the policy server may distribute the LI policy to one or more devices, such as the base station and the LI server (at 1.5).

The base station may use the LI policy to identify MEC and LI network traffic (at 1.6), which may include network traffic that corresponds to content hosted by the local MEC cloud and that is subject to LI. For example, the base station may receive, from the UE, a request for content. Since the UE may not be aware of the local MEC cloud and/or of the content hosted by the local MEC cloud, the request for the content may be directed to a particular content source available via the Internet.

Upon receiving the request, while the request itself may be directed to a remote content source, the base station may determine whether the requested content is available locally at the MEC cloud. If so, the base station may also determine whether the request is subject to the LI policy. If the content is available at the local MEC cloud but is not subject to the LI policy, the base station may provide a copy of the content to the UE without providing a copy to the LI infrastructure. If the request is available at the local MEC cloud and subject to the LI policy, the base station may provide a copy of the requested content to the UE and a copy of the request (and/or a copy of the content itself) to the LI infrastructure (at 1.7).

If the content is not available at the MEC, the base station may forward the request for the content to the core network, where an LI server may determine whether the request is subject to the LI policy (at 1.8). If the request is not subject to the LI policy, the LI server may forward the request to the content source without providing a copy of the request to the LI infrastructure. If the request is subject to the LI policy, the LI server may forward the request to the content source and provide a copy of the request to the LI infrastructure. In response to the request, the content source may send the requested content to the UE via the core network (at 1.9). As the content is sent through the core network, the LI server may determine whether the content is subject to the LI policy. If so, the LI server may forward the content to the UE and provide a copy of the content to the LI infrastructure. If the LI policy does not apply to the content, the LI may forward the content to the UE without sending a copy to the LI infrastructure.

In some embodiments, when content hosted by the local MEC cloud is provided to the UE, the content may be provided using the Internet Protocol (IP) address of the content source. Additionally, the quality of the content hosted by the local MEC cloud may be the same as the quality of the content available at the content source. Thus, the UE may have the same Quality of Experience (QoE) regardless of whether the content is provided by the local MEC cloud or the content source. As such, the UE may not be able to determine whether the content being provided is from the local MEC cloud or the content source.

Furthermore, the copy of content provided to the LI infrastructure may be the same (e.g., in quality) as the copy of the content provided to the UE. For example, when a copy of content is provided by the local MEC cloud to the UE, the local MEC cloud may also provide a copy of the content to the LI infrastructure. As such, the organization (e.g., government agency, law enforcement entity, etc.) operating the LI infrastructure may have an exact copy of the content received by the UE. In addition, since the base station and LI server may only provide a copy of the content request (and/or content) to the LI infrastructure, when an LI policy is applicable, the privacy of UEs and network traffic outside of the LI policy may be preserved.

Figure 2:
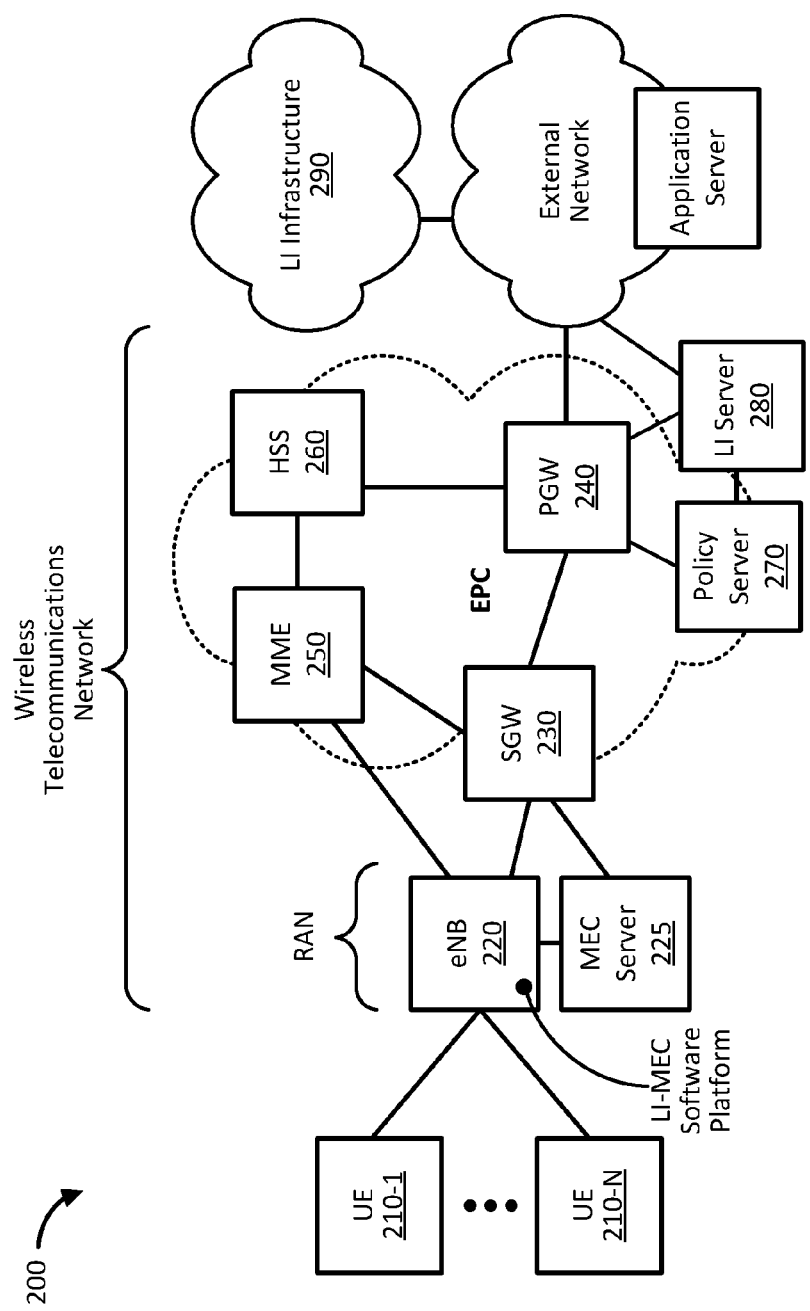
FIG. 2 is a diagram of an example environment in which systems and/or methods described herein may be implemented.

FIG. 2 illustrates an example environment 200 in which systems and/or methods described herein may be implemented. Environment 200 may include UE 210-1 through 210-N (which may be referred to herein individually as "UE 210" or collectively as "UEs 210"), a wireless telecommunications network, and an external network. The wireless telecommunications network may include an Evolved Packet System (EPS) that includes a Long-Term Evolution (LTE) network and/or an evolved packet core (EPC) network that operates based on a 3rd Generation Partnership Project (3GPP) wireless communication standard. The EPC may be connected to LI infrastructure 290. The LTE network may be, or may include, radio access networks (RANs) that include one or more base stations, some or all of which may take the form of enhanced Node Bs (eNBs) 220, via which UEs 210 may communicate with the EPC network. As shown, eNB 220 may be connected to MEC server 225.

The EPC network may include Serving Gateway (SGW) 230, PDN Gateway (PGW) 240, Mobility Management Entity (MME) 250, Home Subscriber Server (HSS) 260, and/or policy server 270. As shown, the EPC network may enable UEs 210 to communicate with an external network, such as a Public Land Mobile Networks (PLMN), a Public Switched Telephone Network (PSTN), and/or an Internet Protocol (IP) network (e.g., the Internet).

UE 210 may include a portable computing and communication device, such as a personal digital assistant (PDA), a smart phone, a cellular phone, a laptop computer with connectivity to the wireless telecommunications network, a tablet computer, etc. UE 210 may also include a non-portable computing device, such as a desktop computer, a consumer or business appliance, or another device that has the ability to connect to a RAN of the wireless telecommunications network. UE 210 may also include a computing and communication device that may be worn by a user (also referred to as a wearable device) such as a watch, a fitness band, a necklace, glasses, an eyeglass, a ring, a belt, a headset, or another type of wearable device. UE 210 may be capable of downloading, installing, and/or executing software (e.g., apps), which may be available from a server (or another type of network device) operating as a virtual store, an application library or repository, or another type of service from which UE 210 may obtain the software.

eNB 220 may include one or more network devices that receives, processes, and/or transmits traffic destined for and/or received from UE 210 (e.g., via an air interface). eNB 220 may be connected to a network device, such as site router, that functions as an intermediary for information communicated between eNB 220 and the EPC. As shown, eNB 220 may include an LI-MEC software platform that may enable eNB 220 to perform one or more of the operations described herein. For example, based on LI policies received from policy server 270, the LI-MEC software platform may 1) identify requests, from UE 210, for content corresponding to an LI policy; 2) determine whether a copy of the content is stored locally by MEC 225; 3) provide LI services, regarding content, when the content is stored by MEC 225; and 4) cause the EPC (e.g., LI server 280) to provide LI services, regarding the content, when the content is not stored by MEC server 225. Detailed examples of these capabilities are discussed below with reference to FIGS. 3-6.

MEC server 225 may include one or more server devices that may communicate with eNB 220 and provide a cloud computing environment for hosting one or more types of content. Examples of content may include social networking services, video streaming services, audio streaming services, online banking services, messaging services, etc. For example, a social networking organization may use an application server that is available via the Internet to host a social networking service. In order to provide superior service to users, the organization may decide to have another instance of the social networking service hosted by MEC server 225 so that requests for content for the social network service may be handled at base station 220 instead of having to be relayed back and forth through the EPC. In some embodiments, MEC server 225 may include multiple server devices that are part of, attached to, connected to, or otherwise within close proximity of eNB 220.

SGW 230 may aggregate traffic received from one or more eNBs 220 and may send the aggregated traffic to an external network or device via PGW 240. Additionally, SGW 230 may aggregate traffic received from one or more PGWs 240 and may send the aggregated traffic to one or more eNBs 220. SGW 230 may operate as an anchor for the user plane during inter-eNB handovers and as an anchor for mobility between different telecommunication networks.

PGW 240 may include one or more network devices that may aggregate traffic received from one or more SGWs 230, and may send the aggregated traffic to an external network. PGW 240 may also, or alternatively, receive traffic from the external network and may send the traffic toward UE 210 (via SGW 230 and/or eNB 220).

MME 250 may include one or more computation and communication devices that act as a control node for eNB 220 and/or other devices that provide the air interface for the wireless telecommunications network. For example, MME 250 may perform operations to register UE 210 with the wireless telecommunications network, to establish bearer channels (e.g., traffic flows) associated with a session with UE 210, to hand off UE 210 to a different eNB, MME, or another network, and/or to perform other operations. MME 250 may perform policing operations on traffic destined for and/or received from UE 210.

HSS 260 may include one or more devices that may manage, update, and/or store, in a memory associated with HSS 260, profile information associated with a subscriber (e.g., a subscriber associated with UE 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 210. Additionally, or alternatively, HSS 260 may perform authentication, authorization, and/or accounting operations associated with the subscriber and/or a communication session with UE 210.

Policy server 270 may receive requests for LI services, generate LI policies based on the requests, and distribute the LI policies to appropriate devices (e.g., eNB 220 and LI server 280) within the wireless telecommunication network. In some embodiments, policy server 270 may enable (e.g., via a web interface) users of LI infrastructure 290 to submit requests for LI services and provide information pertinent to creating LI policies (e.g., content of interest, content sources of interest, forwarding information (e.g., an IP address) for sending requests for content and copies of content itself to LI infrastructure 290. Additionally, policy server 270 may enable users to view, manage, and update LI policies, discontinue active LI policies, reactivate discontinued LI policies, etc. In some embodiments, policy server 270 (or one or more functions of policy server 270) may be part of another EPC device, such as a Policy and Charging Rules Function (PCRF).

LI server 280 may receive LI policies and monitor network traffic for content requests and determine whether content requests correspond to content identified in any LI policies. When the content matches an LI policy, LI server 280 may provide a copy of the content request and the content itself to LI infrastructure 290. LI server 280 may include one or more tools for performing these functions, such as a Traffic Detection Function (TDF), one or more LI polices (which may include Traffic Flow Templates (TFTs), IP flow templates, and filtering tables) to determine whether content is relevant to a LI policies. In some embodiments, LI server 280 (or one or more functions of LI server 280) may be incorporated into another EPC device, such as PGW 240.

LI infrastructure 290 may include one or more computing devices, such as a server device or a collection of server devices, capable of communicating with one or more devices of the wireless telecommunication network. LI infrastructure 290 may be owned and/or operated by an organization (e.g., a government contractor, a government agency, etc.) in charge of the LI efforts described herein. In some embodiments, LI infrastructure 290 may include a dedicated gateway device through which some or all of the communications between LI infrastructure 290 and the wireless telecommunication network occur. For example, when a request for content and a copy of the content itself is sent to LI infrastructure 290 as part of the LI services described herein, the request and the content may be send to LI infrastructure 290 via the dedicated gateway device. In some embodiments, LI infrastructure may include a data center that includes multiple servers capable of sharing hardware resources (e.g., processing, memory, storage, and networking capacity) to provide cloud computing services. The data center may be located in a dedicated building, such as a warehouse or other facility capable of housing data center 220.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Additionally, the devices of environment 200 may interconnect with each other and/or other devices via wired connections, wireless connections, or a combination of wired and wireless connections. In some embodiments, one or more devices of environment 200 may be physically integrated in, and/or may be physically attached to, one or more other devices of environment 200. Also, while "direct" connections may be shown between certain devices in FIG. 2, some of said devices may, in practice, communicate with each other via one or more additional devices and/or networks. In addition, one or more of the devices illustrated in FIG. 2 (and/or one or more of the functions thereof) may be implemented as a virtual device or a virtual network function (VNF) that are deployed as part of a software defined network (SDN) implemented in a cloud computing environment consisting of multiple server devices capable of sharing resources (e.g., processing capacity, memory capacity, storage capacity, network capacity, etc.). Additionally, while the devices of FIG. 2 may corresponds to a $4^{th}$ Generation (4G) network of the 3GPP Communication Standards, the techniques described herein may also, or alternatively, be implemented in a 5th Generation (5G) network of the 3GPP Communication Standards.

Figure 3:
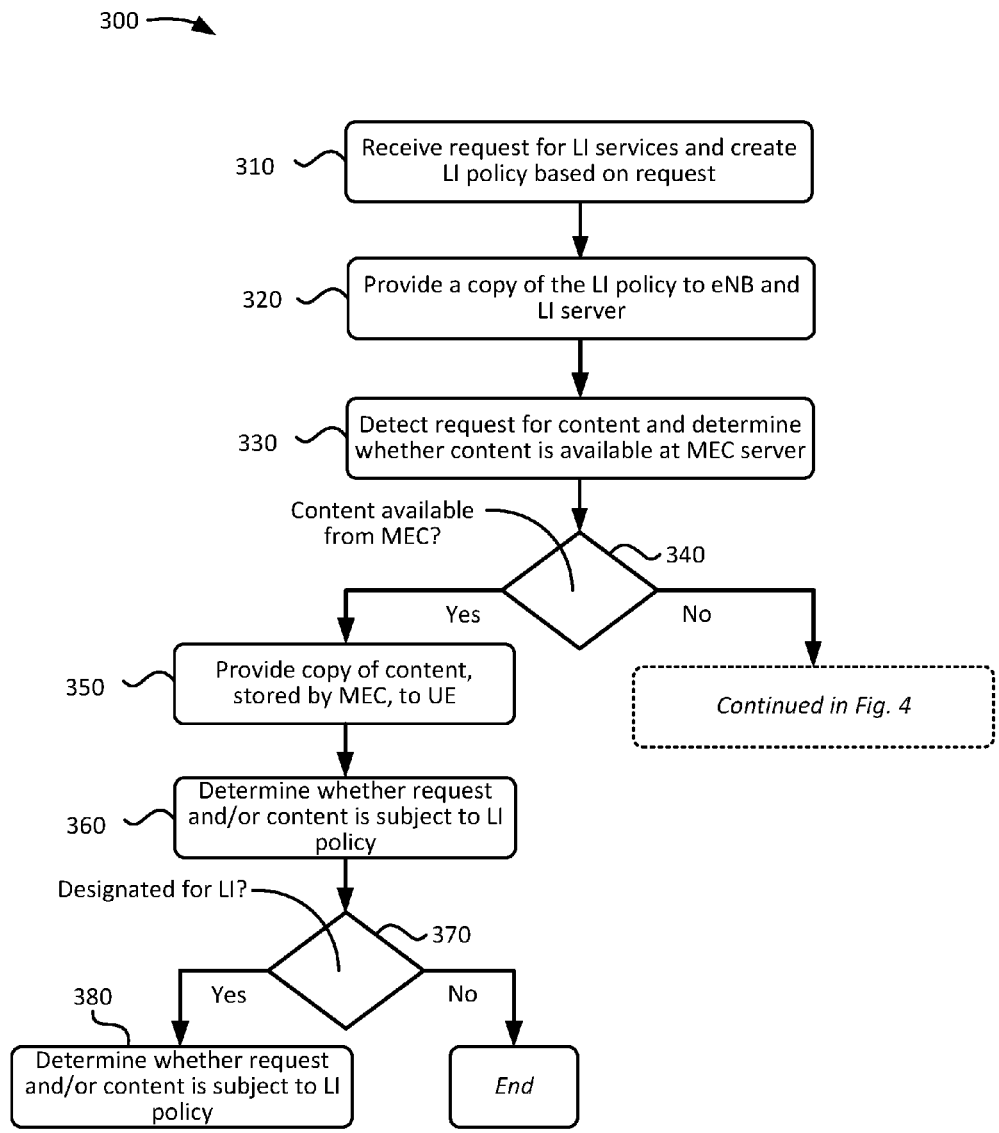
FIGS. 3 and 4 are diagrams of an example process for providing Lawful Interception services in a wireless telecommunication network that includes a Radio Access Network (RAN) with Mobile Edge Computing (MEC) capabilities.
Figure 4:
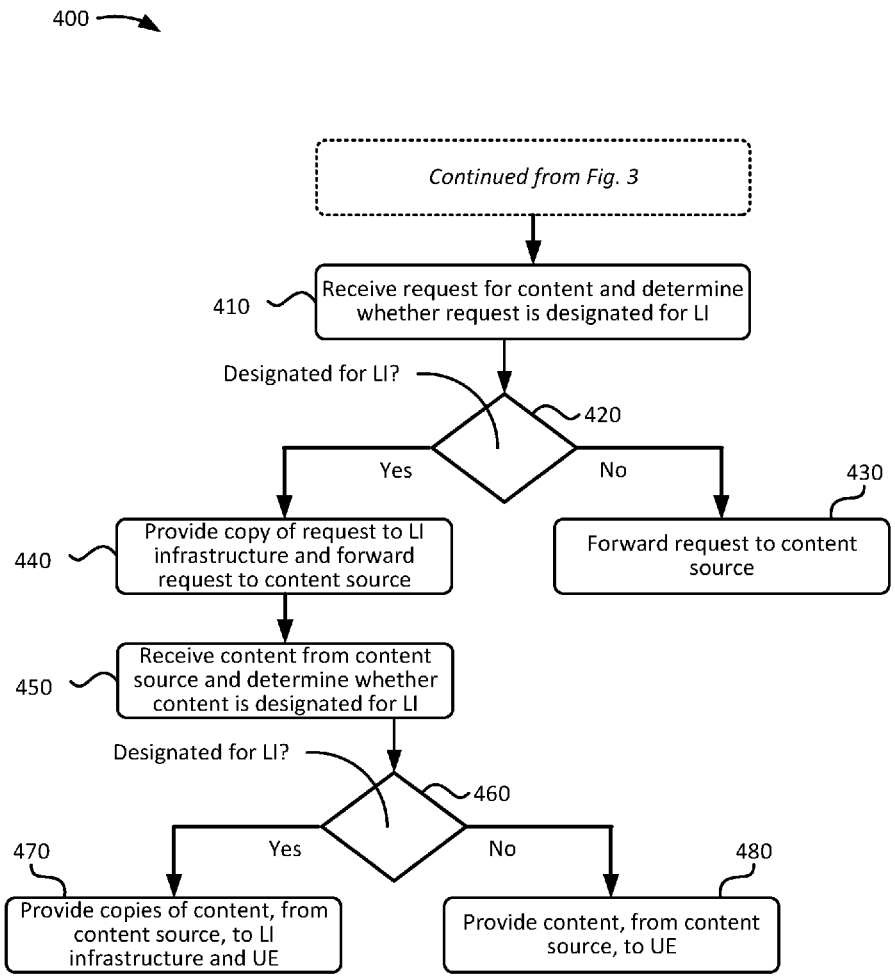

FIGS. 3 and 4 are diagrams of an example process (300 and 400, respectively) for providing LI services in a wireless telecommunication network that includes a RAN with MEC capabilities. Process 300 may be performed by one or more of: eNB 220, MEC server 225, and policy server 270. For example, blocks 310-330 may be performed by policy server 270, and blocks 340-390 may be performed by eNB 220 and MEC server 225. Process 400 may be performed by one or more devices of an EPC, including LI server 280. In some embodiments, one or more of the operations of process 300 and 400 may be performed by one or more additional, or alternative, devices, such as the devices described above with reference to FIG. 2.

As shown in FIG. 3, process 300 may include receiving a request for LI services and creating an LI policy based on the request (block 310). For example, policy server 270 may receive a request, originating from LI infrastructure 290, for LI services and may generate an LI policy based on information in (or provided with) the request. The request may include a description of network traffic that falls within the scope of the LI policy, instructions for identifying the network traffic to which the LI policy is directed, and instructions for forwarding network traffic subject to the LI policy. The LI policy may include one or more Traffic Flow Templates (TFTs) and/or IP Flow templates that may be used to identify the types of network traffic that are subject to the LI policy. The LI policy may also include instructions for detecting network traffic that corresponds to the TFTs and/or IP Flow templates, which may include the use of a Traffic Detection Function (TDF).

In some embodiments, the LI policy may information (e.g., an IP address, Mobile Subscriber Number (MDN), an International Mobile Subscriber Identity (IMSI), etc.) for identifying a device associated with network activity, such as a UE sending a communication, a UE receiving a communication, a server device providing content, etc. The LI policy may also include information (e.g., a Universal Resource Locator (URL), a file name, an IP address and port number, etc.) for identifying content subject to the LI policy.

Additionally, the LI policy may include a description of certain types of network traffic (e.g., requests for content, requests for access to a service or device, etc.). In some embodiments, the LI policy may include a combination of device identification information, content identification information. For example, the LI policy may include instructions to capture network traffic that corresponds to a particular UE sending a request to a particular device (e.g., an application server) for particular content (e.g., a specific video file). The instructions for providing the LI infrastructure with a copy of the captured network traffic may include instructions for eNB 220 to forward the copy directly to the LI infrastructure or instructions for eNB 220 to forward the copy to the LI infrastructure via LI server 280. In some embodiments, LI server 280 may forward the copy to the LI infrastructure immediately. In other embodiments, LI server 280 may forward the copy to the LI infrastructure after a temporary delay, which may managed and implemented via Middle-box protocol.

Additionally, the LI policy may identify other types of information that should be provided to LI infrastructure, such as a timestamp corresponding to captured network traffic (e.g., a request for content from UE 210 and/or content provided to UE 210). In some embodiments, the LI policy may include a duration for how long the LI policy should be implemented, a start date/time for when the LI policy should be initially implemented, an end date/time for when the LI policy should be discontinued, times of day for when the LI policy should be implemented, etc. In some embodiments, the LI policy may also include geographic locations (which may correspond to one or more RANs of the wireless telecommunication network) where the LI policy should be implemented.

Process 300 may include providing the LI policy to eNB 220 and LI server 280 (block 320). For instance, policy server 270 may send a copy of the LI policy to a RAN (e.g., eNB 220 and/or MEC server 225) and the copy of the LI policy may be stored at the RAN (e.g., by the eNB 220 itself or by MEC server 225). Policy server 270 may also provide a copy of the LI policy to LI server 280. As described herein, the copy of the LI policy stored at the RAN may be used to determine whether LI services are to be provided for content stored at the RAN (e.g., by MEC server 225); whereas, the copy of the LI policy stored by LI server 280 may be used to determine whether LI services are to be provided for content available other than the RAN (e.g., content available at the content source via the Internet).

In some embodiments, the LI policy may only be sent to certain RANs (e.g., eNBs 220 and/or MEC servers 225). For instance, if/when the LI policy is only to be implemented in certain geographic areas (e.g., a country, a state, a province, a city, a county, a neighborhood, etc.), only the RANs that correspond to those geographic areas may receive a copy of the LI policy. A copy of the LI policy may also be stored in the core network (e.g., by policy server 270). The policy server 270 may also store a copy of the LI policy. The copy stored by the policy server 270 may function as a master copy that may be viewed, managed, and updated by, for example, a user of LI infrastructure 290. The master copy may also be used to distribute copies of the LI policy to RANs that have not yet received the LI policy (e.g., a newly deployed RAN), update/replace outdated copies of the LI policy stored by a RAN and/or LI server 280, or distribute the LI policy to a RAN that is specified in a recently updated LI policy (but not a previous version of the LI policy), etc.

Process 300 may also include detecting a request for content and determining whether the content is available at MEC server 225 (block 340). For example, eNB 220 may monitor network traffic from UE 210 for content requests, which may include eNB 220 implementing one or more tools such as a TDF. eNB 220 may determine whether the requested content is available at MEC server 225 by providing the request to MEC server 225. If the content is available at MEC server 225, MEC server 225 may respond to the request by providing a copy of the content to eNB 220. Thus, in some embodiments, eNB 220 may determine whether content is available at MEC server 225 by forwarding the content request (from UE 210) to MEC server 225.

In some embodiments, eNB 220 may identify content requests based on the type of message that is received from UE 210 (e.g., a Hypertext Transfer Protocol (HTTP) Request message) and/or information in the message itself, such as an IP address, a URL, a file type, etc., that corresponds to content or a recognized location thereof. When eNB 220 identifies that a message is a request for content, eNB 220 may determine whether the content is stored by MEC server 225 by forwarding the request to MEC server 225. The request may be directed to an original content source (such as an application server accessible via the Internet); however, when MEC server 225 hosts content (e.g., an instance of a particular web application), MEC server 225 may map and record the newly hosted content (i.e., the content hosted by MEC server 225) to the public location information (e.g., IP address, URL, etc.) of the original instance of the content. Consequently, eNB 225 may receive a request directed to a content source publicly available via the Internet and may map the location information included in the request to the instances of content that MEC server 225 is currently hosting. Thus, eNB 220 may determine whether requested content is available on MEC server 225 based on how/whether MEC server 225 is able to resolve the request and return content.

In some embodiments, eNB 220 may also, or alternatively, analyze the request to determine whether the content is available at MEC server 225. For example, when an instance of content (e.g., a social networking service, a video streaming service, a banking service, etc.) is hosted by MEC server 225, eNB 220 may add an entry, for the content, to a list, catalog, or registry of content hosted by MEC 225. The entry may include information for matching a request for the content to the content itself, such as an IP address, a URL, a file name, etc. Thus, eNB 220 may compare the information in the request for content to the information provided by the registry of content hosted by MEC server 225 to determine whether the content is locally available.

When the requested content is not available from MEC server 225, process 300 may continue with the operations illustrated in FIG. 4. When the requested content is available from MEC server 225 (block 340—Yes), process 300 may include providing a copy of the content, stored by MEC server 225, to UE 210 (block 350). For example, eNB 220 may receive a copy of the content from MEC server 225 and may forward the content to UE 210. As described herein, the content provided to UE 210 may retain the IP address of the original content source, such that UE 210 remains unaware that the content was provided by a local instance of content hosted by MEC server 225.

Process 300 may also include determining whether the request and/or the content is designated for LI (block 360). As described above, when an LI policy is created for particular content, eNB 220 may receive a copy of the LI policy, which may include information for identifying whether content is flagged, marked, or otherwise subject to LI. Examples of such information are provided above and may include an TFT or an IP Flow template for the content. When the requested content is not designated for LI (block 370—No), process 300 may end since the content may have already been provided to UE 210 (see, block 350).

When the requested content is designated for LI (block 370—Yes), process 300 may include providing a copy of the request and/or content to LI infrastructure 290 (block 380). For example, eNB 220 may create a copy of the content sent to UE 210 and forward the request and the copy of the content to LI infrastructure 290. eNB 220 may send the information (e.g., the content and the request for the content) to LI infrastructure 290 based on instructions provided in the LI policy for the content. For example, eNB 220 may send the request and a copy of the content to an EPC device (e.g., LI server 280) using a General Packet Radio Service (GPRS) Tunneling Protocol (GTP) between eNB 220 the EPC, and the EPC device may forward the request and the copy of the content to LI infrastructure 290.

Referring now to FIG. 4 (as a continuation from process 300 of FIG. 3), process 400 may include receiving a request for content and determining whether request is designated for LI (block 410). For example, when eNB 210 determines that UE 210 has requested content that is not available at MEC server 210, eNB 210 may forward to the request to LI server 280. In response the request, LI server 280 may determine whether the request is subject to an LI policy. For example, LI server 280 may use a TFT, an IP flow template, a TDF, and/or instructions included in the LI policy to determine whether the LI policy applies to the request for content.

When the request is not designated for LI (block 420—No), process 400 may include forwarding the request to the content source (block 430). For example, LI server 280 may send the request for the content to the content source (e.g., via the Internet). In response, the content source may send the requested content to UE 210 via the EPC and eNB 220.

When the request is designated for LI (block 420—Yes), process 400 may include providing a copy of the request to LI infrastructure 290 and forwarding the request to the content source (block 440). For instance, LI server 280 may send the copy of the request to LI infrastructure 290 based on an IP address, a URL, etc., of the LI infrastructure 290, which may be included in the LI policy. LI server 280 may also send the request for the content to the content source (e.g., via the Internet). In response, the content source may send the requested content to UE 210 via the EPC and eNB 220.

Process 400 may include determining whether the requested content is designated for LI (block 450). For example, when the content source sends the requested content to UE 210, LI server 280 may determine whether the requested content is subject to the LI policy. For instance, LI server 280 may use a TFT, an IP flow template, a TDF, and/or instructions included in the LI policy to determine whether the LI policy applies to the requested content.

When the requested content is designated for LI (block 460—Yes), process 400 may include providing the content, from the content source, to UE 210 and to LI infrastructure (block 470). For example, when LI server 280 determines that content, from the content source, is subject to the LI policy, LI server 280 may create a copy of the content and send the copy of the content to LI infrastructure 290. LI server 280 may also forward the content, from the content source, to UE 210 so that UE 210 and LI infrastructure 290 each receive a copy of the content. When the requested content is not designated for LI (block 460—No), process 400 may include providing the content, from the content source, to UE 210. In such a scenario, the content may be provided to UE 210 (via the EPC and eNB 220) without providing a copy of the content to LI infrastructure 290 (480).

Figure 5:
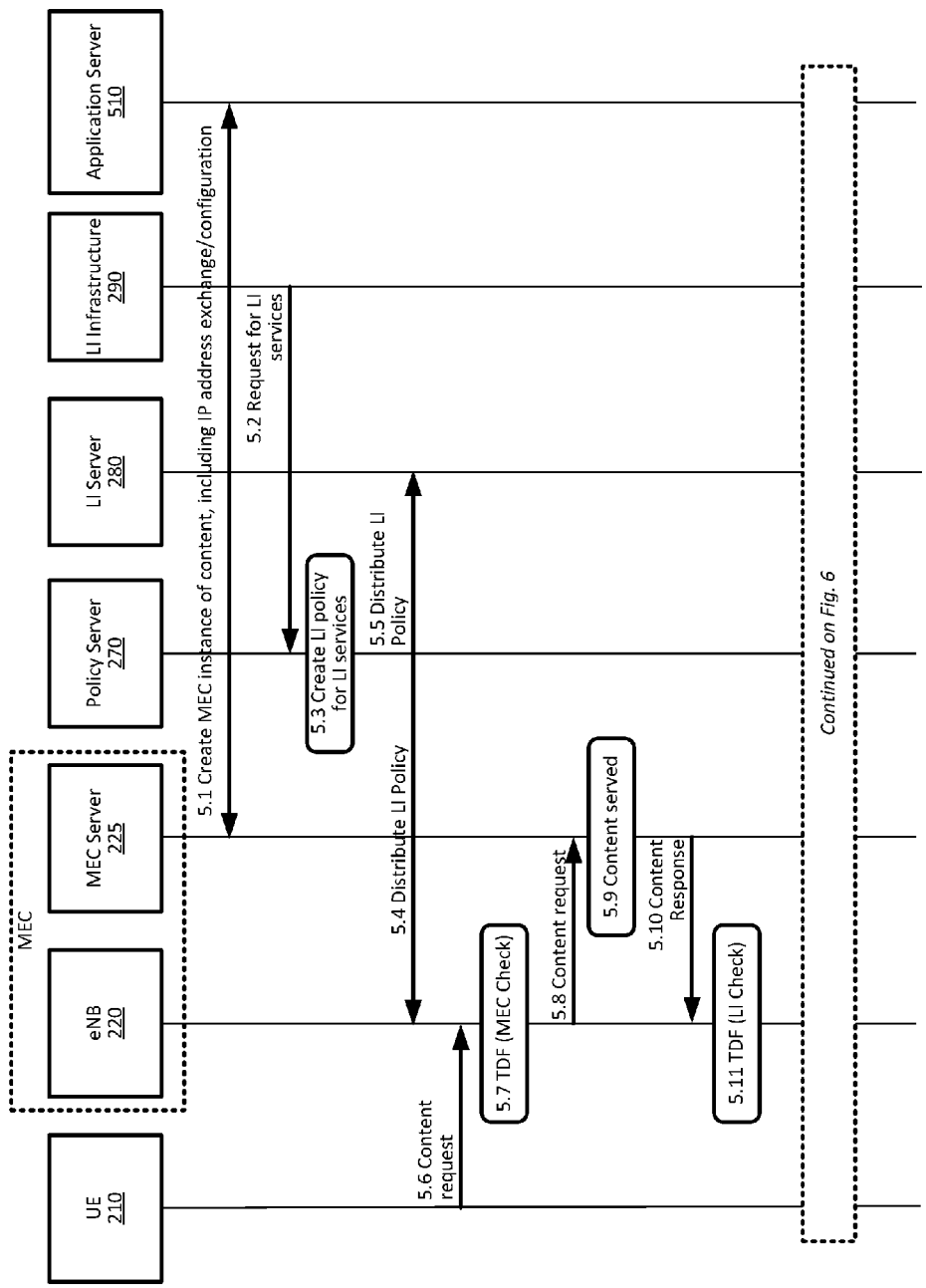
FIGS. 5 and 6 are diagrams of an example process for providing LI services for content hosted at RANs using MEC.
Figure 6:
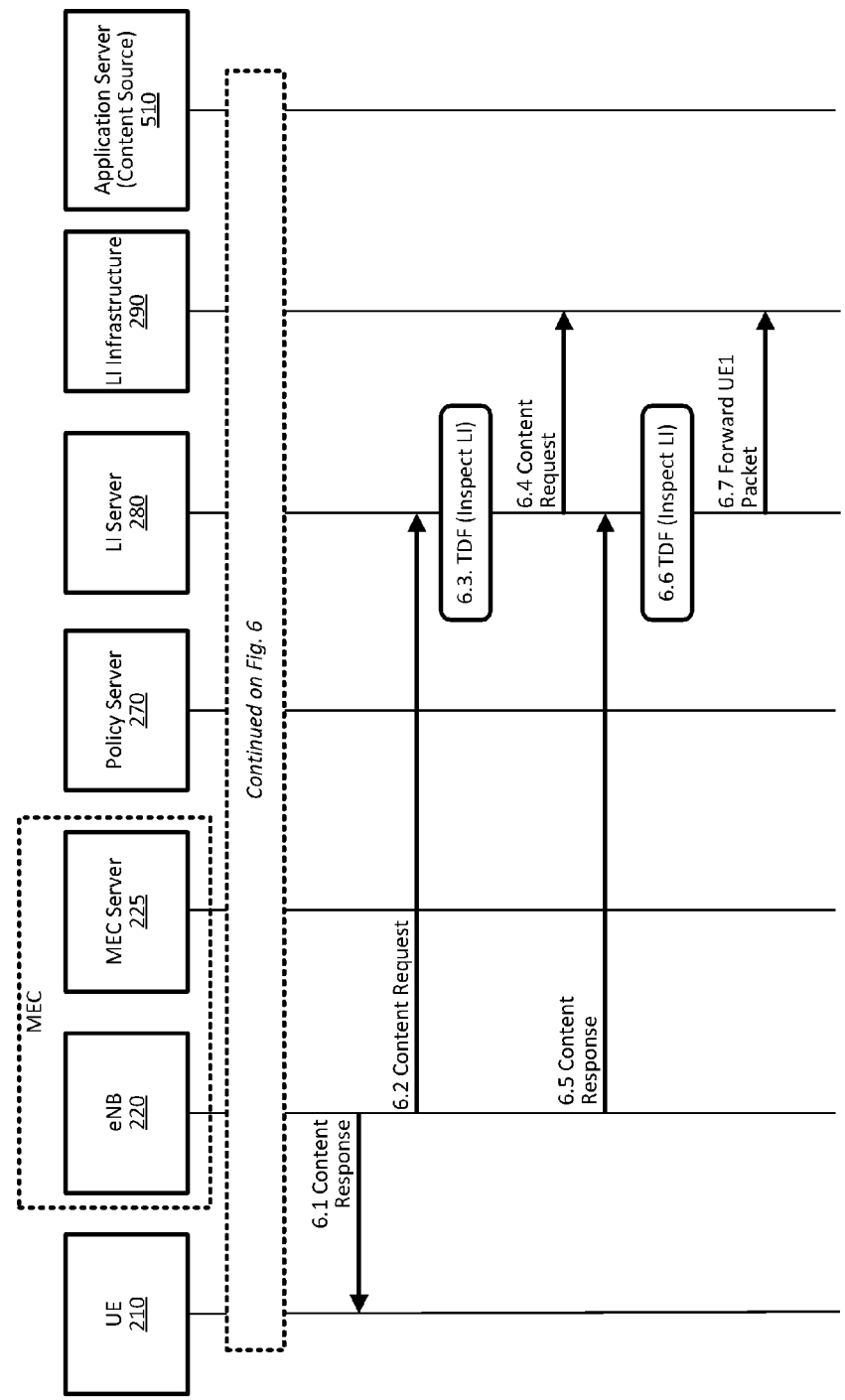

FIGS. 5 and 6 are diagrams of an example process for providing LI services for content hosted at RANs using MEC. The example of FIGS. 5 and 6 may include UE 210, eNB 220, MEC server 225, policy server 270, LI server 280, LI infrastructure 290, and application server 510. Descriptions of UE 210, eNB 220, MEC server 225, policy server 270, LI server 280, and LI infrastructure 290 are provided above with reference to FIG. 2. Application server 510 may include one or more server devices operating as a content source that is accessible via the Internet.

As shown, MEC server 225 and application server 510 may communicate with one another to create an instance of content at MEC server 225 (at 5.1). For example, application server 510 may host content, such as a social network service, media streaming service, a messaging service, etc., that is also accessible via the Internet. Based on the information received from application server 510, MEC server 225 may configure the newly created instance of the content so that the instance hosted by MEC server 225 appears and operates (from the perspective of UE 210) the same as the instance hosted by application server 510. For example, MEC server 225 may map (or otherwise associate) the public IP address of the instance hosted by application server 510 to the new instance hosted by MEC server 225, such that when UE 210 sends a request for content using the public IP address of the content hosted by application server 510, MEC server 225 may use the public IP address to identify and return the new instance of the content stored by MEC server 225. Once an instance of the content is deployed by MEC server 225, eNB 220 may respond to request, from UE 210, for the content based on the instance hosted by MEC server 225.

A user of LI infrastructure 290 may send a request for LI services to policy server 270 (at 5.2). As described above, the request may identify the network traffic (e.g., a request for content and/or the content itself) to be included in the LI service and device/location (e.g., an IP address of a gateway device of LI infrastructure 290) where copies of the network traffic are to be sent. The request may also include a Traffic Flow Template (TFT) or an IP Flow template that corresponds to the network traffic of interest.

In response to the request, policy server 270 may create an LI policy that may be used to provide the LI services (at 5.3). The LI policy may be based on the request for the LI services. For example, the LI policy may include identification and location information corresponding to the content, in addition to a device/location where copies of the content and/or the corresponding content request are to be sent. The LI policy may also include the TFT and/or IP flow template for the content of interest.

As shown, policy server 270 may provide a copy of the LI policy to eNB 220 and another copy of the LI policy to LI server 280 (at 5.4 and 5.5). Distributing the LI policy to eNB 220 may enable LI services to be provided for content stored by MEC server 225. Distributing the LI policy to LI server 280 may enable LI services to be provided for content that is stored by application server 510 (but not MEC server 225). Thus, as described herein, providing copies of the LI policy to eNB 220 and LI server 280 may enable the wireless telecommunication network to provide LI services for content regardless of where the content is stored. Additionally, the LI policy may include instructions for eNB 210 to forward copies of network traffic to LI server 280, and/or instructions for LI server 280 to forward the copies to LI infrastructure 290.

UE 210 may communicate a request for content to eNB 220 (at 5.6). In response, eNB 220 may check whether the content is available at MEC server 225, which may be done by applying a TDF to the request (at 5.7). Assume that the content is available at MEC server 225. eNB 220 may forward the request to MEC server 225 (at 5.8). In response, MEC server 225 may identify the content corresponding to the request and operate as a server of the content (at 5.9). For example, if the content corresponds to a social networking service deployed on an application server that is accessible via the Internet, MEC server 225 may provide the same service in a similar manner (e.g., as though MEC server 225 were an application server accessible via the Internet). While the original content request, from UE 210, may include a public IP address of application server 510, the original content request may be used (without modification) to access the local instance of the content being served by MEC server 225. With the content being served or otherwise active, MEC server 225 may provide the content (in a content response) to eNB 220 (at 5.10). The content response may prompt eNB 220 to determine whether the content has been designate for LI (at 5.11), which may include using a TDF to compare the content response to a TFT of the LI policy received previously (at 5.4).

Referring now to FIG. 6, assume that the content has been designate for LI. eNB 220 may provide the content to UE 210 (at 6.1). The content response may be sent to UE 210 using the public IP address of the original content source (e.g., the application server accessible via the Internet). Thus, UE 210 may not be able to determine whether the content it receives has come from the original content source or MEC server 225. Additionally, eNB 220 may forward the content request (that originated from UE 210) to LI server 280 (at 6.2). LI server 280 may apply the rules of the LI policy to the content request to determine where to forward the request (at 6.3). Based on the comparison, LI server 280 may forward the content request to LI infrastructure 290 (at 6.4). eNB 220 may also provide the content response to LI server 280 (at 6.5). LI server 280 may apply the rules of the LI policy to the content response to determine where to forward the content response (at 6.6). Based on the comparison, LI server 280 may forward the content to LI infrastructure 290 (at 6.7).

eNB 220 may use IP packets to send the content request and the content to LI server 280. In some embodiments, a GTP tunnel may be established between eNB 220 and LI server 280. eNB 220 may set a Time-to-Live (TTL) value of the inner header to 1, to correspond to the number of hops between LI server 280 an LI infrastructure 290. eNB 220 may use the GTP tunnel to send the packet to LI server 280. After LI server 280 receives the packet, LI server 280 may terminate the GTP tunnel, extract the content request from the packet, and send the content request to LI infrastructure 290. In some embodiments, instead of using a GTP tunnel, eNB 220 may set the TTL of the outer header of the packets to a value that coincides with the number of hops between eNB 220 and LI server 280, which may be determined previously, by eNB 220, as part of a startup procedure.

In some embodiments, eNB 220 may send the content request and the content response to LI server 280 separately as illustrated in FIG. 6. For example, if real-time LI capture is needed, packets may be sent immediately. As such, the content request and the corresponding content response may be sent to LI server 280 at different times. In other embodiments, eNB 220 may send the content request and the content response to LI server 280 together. For example, if only near-real-time LI capture is required (e.g., for streaming recorded media as opposed to live media), the content request and the content response may be sent to LI server 280 together.

FIG. 7 is a diagram of example components of a device 700. Each of the devices illustrated in FIGS. 1, 2, 5, and 6 may include one or more devices 700. Device 700 may include bus 710, processor 720, memory 730, input component 740, output component 750, and communication interface 760. In another embodiment, device 700 may include additional, fewer, different, or differently arranged components. As described herein, a component may be implemented by hardware circuitry, software logic, and/or some combination thereof.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 1320 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1 and 3-6 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be collected in accordance with all applicable laws, will not be released unless authorized by law, and shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. An enhanced Node B (eNB) of a Mobile Edge Computing (MEC) Radio Access Network (RAN) of a wireless telecommunication network, the eNB comprising:
   a non-transitory memory device storing a plurality of processor-executable instructions; and
   one or more processor configured to execute the processor-executable instructions, wherein executing the processor-executable instructions causes the one or more processors to:
      receive, from a core network of the wireless telecommunication network, a Lawful Interception (LI) policy, the LI policy including:
         instructions for determining whether network traffic is subject to LI, and
         an identifier corresponding to a LI infrastructure consisting of one or more server devices;
      receive, from a User Equipment, a request for content, the request including destination information corresponding to a content source located outside the wireless telecommunication network;
      determine, based on the request, whether the content is available locally at the MEC RAN;
      when the content is available at the MEC RAN,
         determine, based on the LI policy, whether the request and the content are subject to LI;
         when the request and the content are subject to LI,
            provide a first copy of the content, from the MEC RAN, to the UE,
            provide, in accordance with the LI policy, the request to the LI infrastructure, and
            provide, in accordance with the LI policy, a second copy of the content, from the MEC RAN, to the LI infrastructure, and
         when the request is not subject to LI,
            provide the first copy of the content, from the MEC RAN, to the UE; and
      when the content is not available at the MEC RAN,
         forward the request for the content source via a core network of the wireless telecommunication network.

2. The eNB of claim 1, wherein executing the processor-executable instructions causes the one or more processors are to:
   prior to receiving the request for the content,
      receive content available at the content source,
      cause one or more server devices, of the MEC RAN, to host an instance of the content; and
      map an Internet Protocol (IP) address, corresponding to the content source, to the instance of the content available at the MEC RAN.

3. The eNB of claim 2, wherein, to provide the first copy of the content, from the MEC RAN to the UE, the one or more processors are to:
   use the IP address of the content source to indicate, to the UE, that a source of the first copy of the content is the content source.

4. The eNB of claim 2, wherein, to determine that the content is available at the MEC RAN, the one or more processors are to:
   forward, to the one or more server devices of the MEC RAN, the request for the content, and
   receive content, corresponding to the request, from the one or more server devices.

5. The eNB of claim 1, wherein:
   the LI policy includes a Traffic Flow Template (TFT) corresponding to content specified in the LI policy, and
   to determine whether the request and the content are subject to LI, the one or more processors are to:
      compare the TFT to the request for the content and the first copy of the content from the MEC RAN.

6. The eNB of claim 1, wherein the LI policy is received, by the eNB, from a policy server of the core network, the policy server being configured to:
   receive a request for the wireless telecommunication network to provide LI services,
   create the LI policy based on the request to provide the LI services, and
   communicate the LI policy to the eNB.

7. The eNB of claim 1, wherein, to provide the request and the second copy of the content to the LI infrastructure, the one or more processors are to:
   communicate the request and the second copy of the content to an LI server, of the wireless telecommunication network, using at least one General Packet Radio Service (GPRS) Tunneling Protocol (GTP) tunnel between the eNB and the LI server.

8. The eNB of claim 7, wherein, upon receiving the request and the second copy of the content, the LI server is to forward the request and the second copy of the content to the Li infrastructure based on a copy of the LI policy stored by the LI server.

9. A method, comprising:
   receiving, by an enhanced Node B (eNB) of a Mobile Edge Computing (MEC) Radio Access Network (RAN) of a wireless telecommunication network, a Lawful Interception (LI) policy, the LI policy including:
      instructions for determining whether network traffic is subject to LI, and
      an identifier corresponding to a LI infrastructure consisting of one or more server devices;
   receiving, from a User Equipment, a request for content, the request including destination information corresponding to a content source located outside the wireless telecommunication network;
   determining, based on the request, whether the content is available locally at the MEC RAN;
      when the content is available at the MEC RAN,
         determining, based on the LI policy, whether the request and the content are subject to LI;
            when the request and the content are subject to LI,
               providing a first copy of the content, from the MEC RAN, to the UE,
               providing, in accordance with the LI policy, the request to the LI infrastructure, and
               providing, in accordance with the LI policy, a second copy of the content, from the MEC RAN, to the LI infrastructure, and when the request is not subject to LI, providing the first copy of the content, from the MEC RAN, to the UE; and when the content is not available at the MEC RAN, forwarding the request for the content source via a core network of the wireless telecommunication network.

10. The method of claim 9, further comprising:

prior to receiving the request for the content, receiving content available at the content source, causing one or more server devices, of the MEC RAN, to host an instance of the content; and mapping an Internet Protocol (IP) address, corresponding to the content source, to the instance of the content available at the MEC RAN.

11. The method of claim 10, wherein providing the first copy of the content, from the MEC RAN to the UE, comprises:

using the IP address of the content source to indicate, to the UE, that a source of the first copy of the content is the content source.

12. The method of claim 10, wherein determining that the content is available at the MEC RAN comprises:

forwarding, to the one or more server devices of the MEC RAN, the request for the content, and receiving content, corresponding to the request, from the one or more server devices.

13. The method of claim 9, wherein:

the LI policy includes a Traffic Flow Template (TFT) that corresponds to content specified in the LI policy, and determining whether the request and the content are subject to LI includes comparing the TFT to the request for the content and the first copy of the content from the MEC RAN.

14. The method of claim 9, wherein the LI policy is received, by the eNB, from a policy server of the core network, the policy server being configured to:

receive a request for the wireless telecommunication network to provide LI services, create the LI policy based on the request to provide the LI services, and communicate the LI policy to the eNB.

15. The method of claim 9, wherein providing the request and the second copy of the content to the LI infrastructure comprises:

communicating the request and the second copy of the content to an LI server, of the wireless telecommunication network, using at least one General Packet Radio Service (GPRS) Tunneling Protocol (GTP) tunnel between the eNB and the LI server.

16. The method of claim 15, wherein, upon receiving the request and the second copy of the content, the LI server is to forward the request and the second copy of the content to the LI infrastructure based on a copy of the LI policy stored by the LI server.

17. A non-transitory computer readable medium storing a plurality of processor-executable instructions, wherein executing the processor-executable instructions causes one or more processors to:

receive, from a core network of the wireless telecommunication network, a Lawful Interception (LI) policy, the LI policy including:

instructions for determining whether network traffic is subject to LI, and an identifier corresponding to a LI infrastructure consisting of one or more server devices;

receive, from a User Equipment, a request for content, the request including destination information corresponding to a content source located outside the wireless telecommunication network;

determine, based on the request, whether the content is available locally at the MEC RAN;

when the content is available at the MEC RAN, determine, based on the LI policy, whether the request and the content are subject to LI;

when the request and the content are subject to LI, provide a first copy of the content, from the MEC RAN, to the UE, provide, in accordance with the LI policy, the request to the LI infrastructure, and provide, in accordance with the LI policy, a second copy of the content, from the MEC RAN, to the LI infrastructure, and when the request is not subject to LI, provide the first copy of the content, from the MEC RAN, to the UE; and when the content is not available at the MEC RAN, forward the request for the content source via a core network of the wireless telecommunication network.

18. The non-transitory computer readable medium of claim 17, wherein executing the processor-executable instructions causes the one or more processors to:

prior to receiving the request for the content, receive content available at the content source, cause one or more server devices, of the MEC RAN, to host an instance of the content; and map an Internet Protocol (IP) address, corresponding to the content source, to the instance of the content available at the MEC RAN.

19. The non-transitory computer readable medium of claim 18, wherein, to provide the first copy of the content, from the MEC RAN to the UE, the one or more processors are to:

use the IP address of the content source to indicate, to the UE, that a source of the first copy of the content is the content source.

20. The non-transitory computer readable medium of claim 18, wherein, to determine that the content is available at the MEC RAN, the one or more processors are to:

forward, to the one or more server devices of the MEC RAN, the request for the content, and receive content, corresponding to the request, from the one or more server devices.

* * * * *